United States Patent [19]

Cowburn

[11] Patent Number: 4,779,894
[45] Date of Patent: Oct. 25, 1988

[54] VEHICLE SUSPENSION

[75] Inventor: David Cowburn, West Midlands, England

[73] Assignee: GKN Technology Limited, Wolverhampton, England

[21] Appl. No.: 46,859

[22] PCT Filed: Sep. 1, 1986

[86] PCT No.: PCT/GB86/00519
§ 371 Date: Apr. 30, 1987
§ 102(e) Date: Apr. 30, 1987

[87] PCT Pub. No.: WO87/01339
PCT Pub. Date: Mar. 12, 1987

[30] Foreign Application Priority Data

Sep. 7, 1985 [GB] United Kingdom ............... 8522236
Sep. 12, 1985 [GB] United Kingdom ............... 8522587

[51] Int. Cl.$^4$ .......................................... B60G 21/04
[52] U.S. Cl. ................................. 280/699; 267/52; 280/669; 280/694
[58] Field of Search .............. 280/669, 688, 690, 694, 280/699, 718, 719; 267/30, 51, 52

[56] References Cited

U.S. PATENT DOCUMENTS 4,557,500 12/1985 Collard et al. ............... 280/669
4,619,466 10/1986 Schaible et al. .............. 280/688

FOREIGN PATENT DOCUMENTS 1805219 5/1969 Fed. Rep. of Germany ...... 280/669
1486038 5/1967 France ........................... 280/718
2520304 7/1983 France ........................... 280/719
207880 3/1984 German Democratic Rep. ............................ 280/688

Primary Examiner—Ross Weaver
Attorney, Agent, or Firm—Marshall, O'Toole, Gerstein, Murray & Bicknell

[57] ABSTRACT

A motor vehicle suspension comprising a leaf spring (24) of composite material extending transversely of the vehicle, pivotally supported at two spaced positions (25, 26) between its ends and connected at its ends to wheel carriers, wherein the spring is resiliently supported, at a central region thereof between its pivotal supports, by resilient support means (31, 32, 33, 34) and the bending stiffness of the spring decreases from its pivotal support positions to the central region. The spring is enclosed in a housing (29) between the support positions (25, 26).

10 Claims, 1 Drawing Sheet

VEHICLE SUSPENSION

This invention relates to a vehicle suspension comprising a spring in the form of an elongate leaf of composite, fibre reinforced plastics, material extending transversely of the vehicle and supported, for generally pivotal movement relative to the vehicle about axes extending transversely of the spring (i.e. longitudinally of the vehicle), at two positions spaced lengthwise of the spring between the ends thereof, the ends of the spring being connected to wheel carrier members. Such a suspension will hereafter be referred to as a suspension of the kind specified.

One example of a suspension of the kind specified is disclosed in WO No. 83/01758. The free end portions of the spring, outboard of the pivotal supports of the spring, are of increasing thickness and decreasing width towards their ends, so that they deflect relatively little in use compared with resilient deflection of the spring between the pivotal support thereof. In effect, such outboard spring portions act as lower wishbone members in respect of constraining the wheels to a desired movement and relationship relative to the vehicle, in addition to their springing function. The suspension further comprises damper struts one connected to each wheel carrier.

The present invention is applicable to a suspension of the kind specified as disclosed in WO No. 83/01758. The invention is also applicable to a suspension of the kind specified wherein the outboard portions of the spring do not act as lower wishbone members but, instead, bear upon or otherwise engage separate wishbone members or links to which the wheel carrier members are connected.

In a suspension of the kind specified, when it is applied to the front wheels of a front wheel drive motor vehicle, the only convenient position in which the spring, extending transversely of the vehicle, can be accommodated is directly beneath the engine-transmission unit of the vehicle. However, the centre of the spring undergoes a considerable vertical displacement when the vehicle's wheels move in bump and rebound in use, and hence when such a spring is mounted with adequate clearance from the engine unit, the ground clearance of the spring may be undesirably limited.

It is one object of the present invention to provide a suspension of the kind specified in which this disadvantage is overcome or reduced. Further objects and advantages of a suspension according to the invention will be pointed out hereafter.

According to the invention, we provide a suspension of the kind specified wherein there is provided resilient support means engaging or arranged to engage at least one surface of the spring at a central region thereof between said positions, to constrain bending of the spring with bump and/or rebound wheel movement in use, and wherein the stiffness of the spring in such bending decreases from said positions to said central region of the spring.

In a suspension according to the invention, the constraint of the central region of the spring by the resilient support means has the effect that the deflections thereof with wheel movement are limited. The spring as a whole does not have to be mounted at such a great distance from the part of the vehicle nearest the centre of the spring, and hence an increase in ground clearance can be achieved.

In the spring of a suspension of the kind specified, the bending moment in the spring increases from its ends to the positions of support of the spring relative to the vehicle structure, and is constant between such positions. In a suspension according to the invention, the engagement of the spring by the resilient element or elements between said positions has the effect that the bending moment in the spring, instead of being constant is reduced, possibly to zero. For constant stress in the spring, which is desirable, the bending stiffness of the spring can be reduced from its support positions to its central region.

In a suspension according to the invention, the springing characteristics are determined by the resilient support means as well as by the bending resilience of the spring between its support positions. This enables a single design of spring to be used to give different suspension characteristics to suit different vehicles, merely by using resilient support means having different characteristics.

The resilient support means may contact the spring surface or surfaces at all times. In this case, the suspension characteristics are always determined by a combination of the characteristics of the spring and of the support means. Alternatively, the support means may contact the spring surface or surfaces only after deflection of the spring from a rest position. In this case, the characteristics of initial movement from the rest position are determined by the spring alone, and thereafter by the combination of the spring and support means. This may be used, for example, to give a suspension with a dual rate or rising rate characteristic.

The resilient support means preferably comprises an element or elements of an elastomeric material.

As above described, the bending stiffness of the spring decreases from its support positions to its central region. To achieve this, the spring may be of constant width and decreasing thickness from said positions to its central region, or may be of constant cross-sectional area, with increasing width and decreasing thickness, between said positions. If the spring is of constant cross-sectional area, it may readily be manufactured by a process such as pultrusion or pulforming, as is well known for springs made of composite, fibre-reinforced plastics, material.

If the suspension is one where the end portions of the spring act as wishbone members or links, such end portions are preferably of decreasiang width and increasing thickness towards the free ends of the spring. Thus, the entire spring may be of constant cross-sectional area.

Preferably the spring between said positions, and the resilient support means therefore, is disposed within an enclosure. Such an enclosure has the beneficial effect of protecting the spring from dirt and possible contamination with oil, and from high temperatures which may be encountered as a result of its disposition in close proximity to the engine unit. Additionally the spring is protected against damage from road debris, e.g. stone chippings. Further, the spring and enclosure therefor, which will contain the support means, provides a unit which may facilitate assembly of the suspension to the vehicle by being readily stored, handled, and fitted.

The invention will now be described by way of example with reference to the accompanying drawings, of which:

Figure 1:
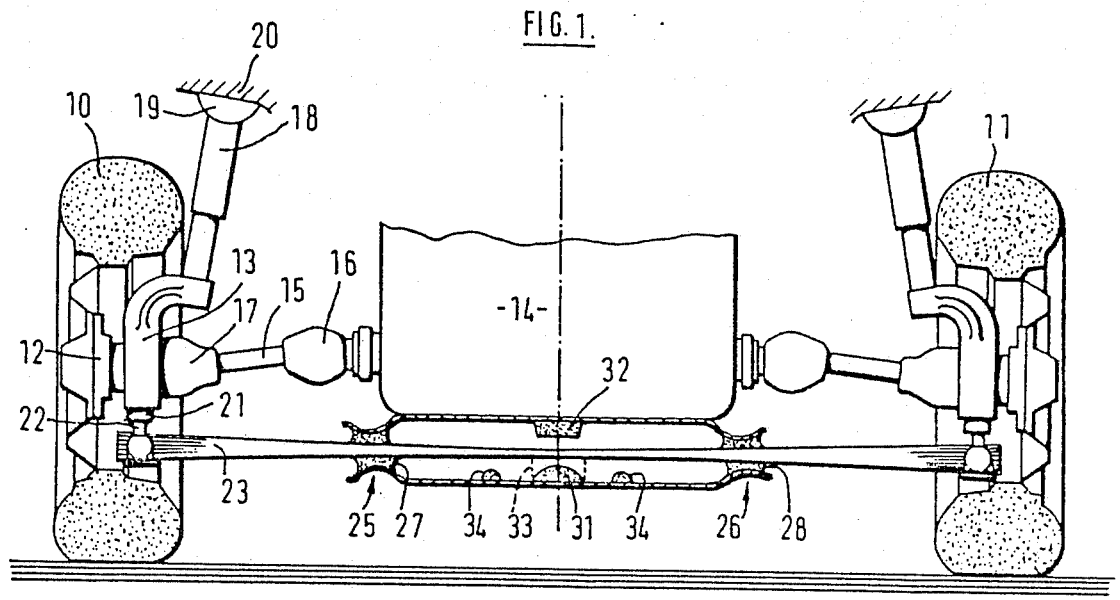
FIG. 1 is a front elevation of a vehicle suspension incorporating the invention.
Figure 2:
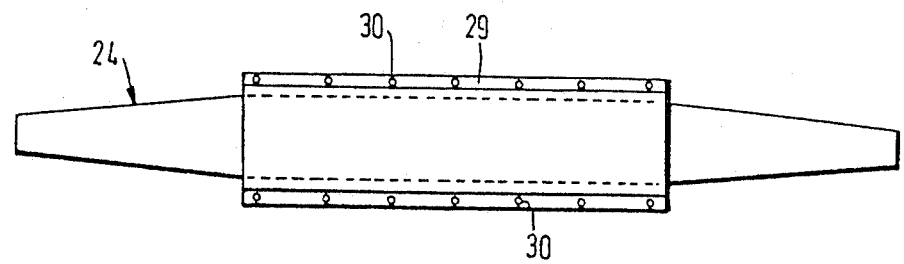
FIG. 2 is a plan of part of the suspension of FIG. 1.

Referring firstly to FIG. 1 of the drawings there is shown diagrammatically the arrangement of a suspension incorporating the invention, for the front, steerable, wheels 10, 11 of a front wheel drive motor vehicle. The wheel 10 has a hub 12 which is rotatably supported by suitable bearings in a carrier member 13, and is drivable from an engine-transmission unit 14 by way of a drift shaft 15 and inboard and outboard constant velocity ratio universal joints 16, 17. Wheel 11 is similarly supported and drivable.

An upper portion of the carrier member 13 is connected to the lower element of a telescopic damper unit 18, whose upper element is supported at 19 on a part 20 of the structure of the vehicle. A lower part 21 of the carrier member 13 is connected to a ball swivel joint 22 which in turn is supported adjacent the free end of an end portion 23 of a spring 24.

The spring 24 extends transversely of the vehicle and is in the form of a one-piece element made of composite, fibre-reinforced plastics, material. As above described, the spring is connected at its free ends to the steerable wheel carrier members, and it is supported, at two spaced positions 25, 26 between its ends, for limited pivotal movement about respective axes which extend longitudinally of the vehicle, i.e. transversely of the spring. This support of the spring is effected by elastomeric bushes 27, 28 provided at the ends of an enclosure 29 through which the central portion of the spring extends. The enclosure 29 comprises upper and lower parts secured together, e.g. by bolts as 30, and is itself secured to the structure of the vehicle. It will be noted that the enclosure 29 is disposed directly beneath the engine-transmission unit 14.

The end portions, as 23, of the spring 24 are of increasing thickness and decreasing width towards their free ends, the cross-sectional area of such spring portions being constant or substantially so. Within the enclosure 29 between the support positions 25, 26, the spring is of constant width and of a thickness which decreases from the support positions to the centre of the spring, so that the stiffness of the spring in its principal direction of bending in use decreases towards the centre of the spring.

Within the enclosure 29 there is provided, beneath the centre of the spring, a resilient abutment element 31. This conveniently comprises an appropriately shaped block of an elastomeric material, and is dimensioned so that the centre of the spring makes contact therewith after a small displacement thereof from the static rest position it assumes when the vehicle is stationary and unloaded or lightly loaded. It will be appreciated that after the spring has made contact with the element 31 upon upward movement of the wheels of the vehicle relative to the body or chassis structure of the vehicle, the characteristics of the suspension are determined by the resistance to deflection of the element 31 as well as by the stiffness of the spring itself.

Above the centre part of the spring within the enclosure 29, there is disposed a further resilient element 32 which cooperates with the spring upon rebound movement of the wheels relative to the vehicle structure. The element 32 may merely act as a rebound stop to prevent excessive movement of the centre of the spring, or may have its properties selected so that it undergoes resilient deformation when contacted by the spring.

Both the elements 31, 32 may be so dimensioned as to be in contact with the spring at all times, as indicated at 33 in FIG. 1 for the element 31. The characteristics of the suspension are then always determined by the stiffness of the spring and of the element 31, 33. Alternatively or in addition, spaced resilient elements, as indicated at 34, may be provided within the enclosure 29. The characteristics of any or all of the elements 31, 32, 33, 34 may be such as to provide a rising rate suspension, i.e. an increase in resistance to deflection as wheel deflection increases.

Figure 3:
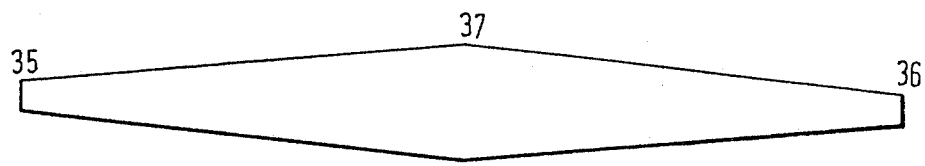
FIG. 3 is a plan view of an alternative form of spring for use in the suspension.

Referring now to FIG. 3 of the drawings, an alternative form of spring for use in the invention is shown. In this spring, the thickness of the spring decreases continuously from each of its free ends 35, 36 to its centre 37, while its width increases continuously over such parts. The spring may thus be of constant cross-sectional area throughout its length, facilitating its manufacture from composite, fibre-reinforced plastics, material by a process such as pulforming. However, a spring with such an increased width at its centre may be more difficult to accommodate in a vehicle suspension.

In use, the spring 24 of the suspension according to the invention behaves generally as the spring in the suspension disclosed in published international patent application WO No. 83/01758. In particular, the end portions of the spring outboard of the positions 25, 26 at which the spring is supported, bend relatively little in use by virtue of their increase in thickness and decreasing width towards their free ends, and, in effect, thereby act as suspension links or wishbone members eliminating the requirement for separate such members. Springing is provided by resilient deflection of the portion of the spring between the support positions 25, 26. Additionally, such support of the spring has the result that roll of the vehicle is resisted.

The engagement of the spring by the resilient element or elements within the enclosure 29 has the effect that the bending moment in the spring, instead of being constant between positions 25, 26, is reduced. For constant stress in the spring, the bending stiffness in the spring may be reduced at its centre.

By appropriate selection of the characteristics of elements 31, 32, different spring characteristics may be obtained, if desired, for spring deflections in the bump and rebound directions from the static position illustrated. By appropriate selection of the characteristics of these elements, a single design of spring can be used to give different characteristics in different vehicle applications.

A further advantage of the arrangement of the spring according to the invention is that the amount of vertical deflection of the centre of the spring between the maximum bump and rebound suspension conditions is reduced, being constrained by the elements 31, 32 within the enclosure 29. Therefore the assembly of spring and enclosure need not occupy such a large amount of space in the vertical direction beneath the engine-transmission unit 14. Ground clearance is thus improved for the vehicle since the spring as a whole would have to be mounted with a greater clearance from the engine transmission unit if the centre of the spring were not so constrained. Further, the centre portion of the spring is protected by the enclosure 29 from the adverse environmental conditions typically encountered at a position beneath the engine unit of a motor vehicle. Thus, the spring is protected to some extent from engine generated heat and from contamination by lubricating oil or the like. The spring is also protected from hazards such as impact from stone chippings or road debris.

Further, by limiting deflection of the centre portion of the spring, the change in the straight line distance between the free ends of the spring as the spring is deformed is minimised. This is advantageous for minimising changes in wheel alignment of the vehicle with suspension movement.

I claim:

1. A vehicle suspension comprising:
   an elongate leaf spring of composite material disposed to extend transversely of the vehicle;
   two support means, at respective positions spaced lengthwise of the spring between the ends thereof, supporting the spring relative to the structure of the vehicle for generally pivotal movement about respective axes extending transversely of the spring;
   a respective wheel carrier member connected to the spring at each end thereof; and
   at least one resilient further support means disposed at a central region of the spring between said two support means and arranged to engage at least one surface of the spring to inhibit bending thereof with movement of said wheel carrier members in use;
   wherein the stiffness of the spring with respect to said bending decreases from the positions of said two support means to the central region of the spring.

2. A suspension according to claim 1 wherein said resilient support means (31, 32, 34) contacts the spring surface or surfaces after deflection of the spring from a rest position.

3. A suspension according to claim 1 wherein said resilient support means (as 33) contacts the spring surface or surfaces at all times.

4. A suspension according to claim 1 wherein said resilient support means comprises an element or elements of elastomeric material.

5. A suspension according to claim 1 wherein the spring (24) is of constant width and decreasing thickness from said positions (25, 26) to said central region thereof.

6. A suspension according to claim 1 wherein the spring (24) is of constant cross-sectional area between said positions (25, 26).

7. A suspension according to claim 5 wherein end positions (23) of the spring are of decreasing width and increasing thickness from said positions (25, 26) to the free ends of the spring.

8. A suspension according to claim 1 wherein the spring (24) is disposed within an enclosure (29) between said positions (25, 26).

9. A suspension according to claim 1 further comprising an enclosure wherein the spring between said support means is enclosed, and the enclosure contains said resilient further support means.

10. A suspension according to claim 9 wherein said two support means for the spring are provided by end portions of said enclosure, and said enclosure is secured to the structure of the vehicle.

* * * * *